United States Patent [19]

Mayne

[11] 3,739,869

[45] June 19, 1973

[54] APPARATUS FOR THE ATTENUATION OF NOISE FROM UNDERWATER SEISMIC SOURCES

[75] Inventor: William Harry Mayne, San Antonio, Tex.

[73] Assignee: Petty Geophysical Engineering Company, San Antonio, Tex.

[22] Filed: Jan. 20, 1970

[21] Appl. No.: 4,310

[52] U.S. Cl..................... 181/.5 H, 340/15, 340/17
[51] Int. Cl............................................. G01v 1/14
[58] Field of Search.................... 181/.5 H, .5 VM, 181/.5 EC; 340/5, 8, 12, 15, 17

[56] References Cited
UNITED STATES PATENTS

| | | | |
|---|---|---|---|
| 3,437,170 | 4/1969 | Brock et al. | 181/.5 H |
| 3,493,072 | 2/1970 | Johnston | 181/.5 |
| 3,038,551 | 6/1962 | McCoy et al. | 181/.5 |
| 3,379,273 | 4/1968 | Chelminski | 181/.5 H |

*Primary Examiner*—Benjamin A. Borchelt
*Assistant Examiner*—N. Moskowitz
*Attorney*—Arnold, White & Durkee, Frank S. Vaden, III, Paul VanSlyke and Tom Arnold

[57] ABSTRACT

Vanes are mounted on an air gun or other seismic source apparatus to form smaller radii of the air bubbles generated by the source to increase the bubble resonant frequency to a higher frequency than the desired seismic signals thereby enabling unwanted noise to be filtered by conventional means. Different-sized air ports provide different-sized bubbles which collapse at different times introducing destructive interference between bubble collapses. Viscoelastic media on the vanes is an effective damping media because of the increased resonant frequencies of the individual bubbles.

11 Claims, 14 Drawing Figures

INVENTOR.
WILLIAM H. MAYNE
BY
Watson, Cole, Grindle & Watson
ATTORNEYS

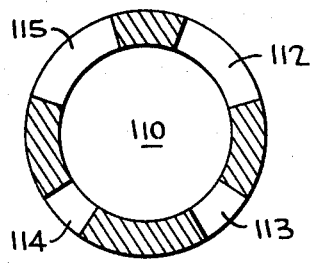
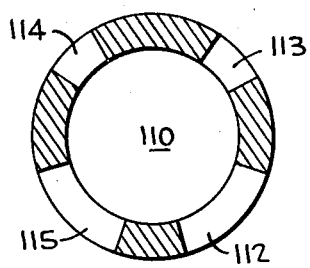
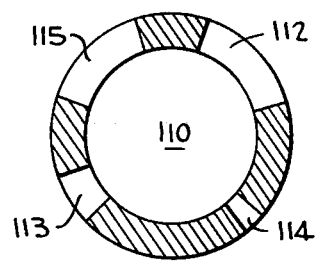
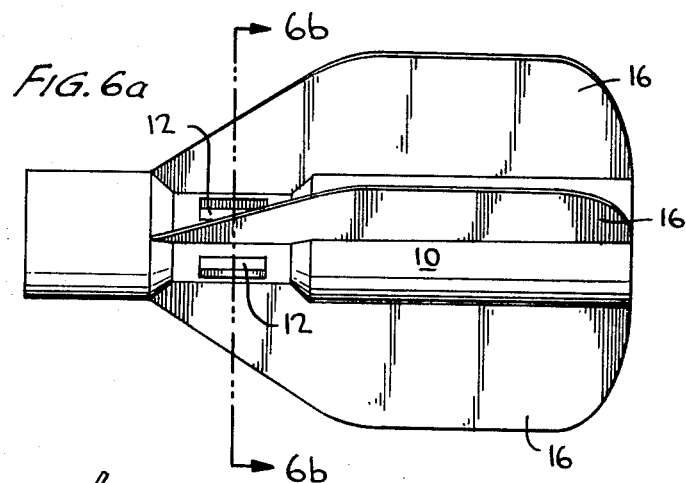
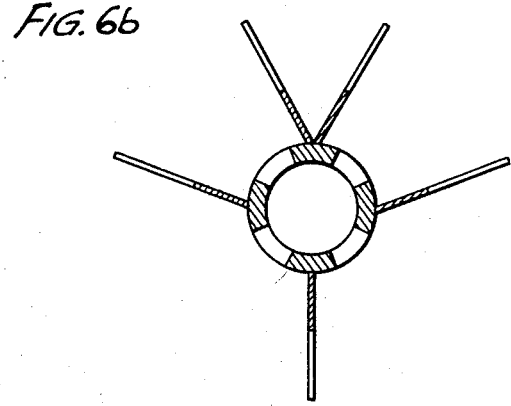
INVENTOR,
WILLIAM H. MAYNE
BY Watson, Cole, Grindle & Watson
ATTORNEYS

APPARATUS FOR THE ATTENUATION OF NOISE FROM UNDERWATER SEISMIC SOURCES

This invention relates to apparatus for generating seismic impulses and, in particular, to such devices for underwater seismic exploration where gaseous bubbles are released by the seismic source.

In offshore seismic exploration, the excitation of pneumatic or other types of sources creates a bubble of air or other gases which provides the necessary seismic energy. The collapse and repeated expansion of the bubble is responsible for the generation of unwanted noise. The resonant frequency of such a seismic exploration source is given by the following empirical formula:

$$R \times F_0 = 326$$

where $R$ is the radius of the bubble in centimeters and $F_0$ is the resonant frequency in Hertz (or cps).

The generation of such a bubble is followed by the periodic contraction and expansion of the bubble which generates unwanted noise. From the above formula, it is apparent that a reduction in the radius of the bubble will cause a corresponding or proportional increase in the resonant frequency of the generated noise. Various apparatus have been employed to reduce or eliminate the noise generation; however, this invention is directed to means for increasing the noise frequency so that it falls outside the frequency range of interest and is sufficiently removed therefrom so that conventional filtering apparatus, such as electrical filters, can be employed to remove the effects of the unwanted noise.

The preferred form of the invention is an air gun, and this form will be described in more detail infra. Bolt Associates, Inc. of Norwalk, Connecticut, have derived a theoretical equation for the particular seismic sources which they manufacture:

$$F = 510 \frac{\left(1 + \frac{H}{33}\right)^{5/6}}{(PV)^{1/3}} \ (Hz)$$

where F is the resonant frequency of the bubble, H is the gun depth in feet, P is the air pressure in pounds per square inch at the gauge (about 15 psi different from at the gun), and V is the volume (in cubic inches) of the high pressure chamber in the gun. This equation describes approximate conditions. For example, if the volume is cut to ⅛ of the original volume, the resonant frequency would be doubled. This may appear as a difficult solution, but doubling the resonant frequency will, under certain conditions, shift the fundamental frequency of the bubble above the frequency range used for seismic exploration. Under such circumstances, the alias filters or high cut filters would remove the bubble oscillation from the seismic signals. For example, the alias filter used for a sample every 4 milliseconds has essentially a flat response (±3 db) up to 75 Hertz and attenuates all higher frequencies. If the bubble frequency in a normal structure at the normal depth is 50 or 60 Hertz, then doubling the frequency to 100 or 120 Hertz would suffice. If the bubble frequency for a particular gun is less than 50 Hertz, either a further increase in the bubble frequency or a decrease in the frequency of the alias filter is required. Usually the latter cannot be done without deterioration of the seismic signals so that the former is the procedure usually available.

In accordance with one embodiment of the invention, the ports of an air gun are divided by vanes to split or divide the generated pulses, thereby reducing the effective radius of the generated air bubble. The vanes may be located immediately over the port exits or mounted adjacent the port exits.

In accordance with another embodiment of the invention, the angle of incidence that the vane makes with the surface of the air gun may be varied to further decrease the radius of the air bubbles and also to cause the bubbles to separate and travel away from the apparatus, thereby reducing the possibility of several bubbles forming a composite bubble. The angle is such that the bubbles will exhaust from the side of the fin rather than at the tail of the fin so that the individual small bubbles will not form into a large bubble at the tail of the fin.

In a further embodiment of the invention, the number of the exit ports may be increased and the size of the exit ports of the gun apparatus may be decreased to increase the frequency of the unwanted generated noise. Destructive interference between bubbles can be obtained using ports having different sizes. Damping may be added to the vanes by viscoelastic coatings. The various embodiments of the invention may be combined to provide a composite apparatus which incorporates the various advantages of each of the individual embodiments.

It is a primary object of the present invention to provide a means for increasing the frequency of the unwanted noise which is generated from an underwater seismic source.

It is a further object of the present invention to provide improved means for reducing the radius of air bubbles emitted from an underwater seismic source.

It is also an object of the present invention to form a series of bubbles having different sizes in the type of seismic source specified herein.

It is yet another object of the invention to provide means for damping the cavitation of a pneumatic bubble.

The above objects and further features and advantages of the invention will be more apparent with the following description when taken in conjunction with the accompanying drawings wherein.

Figure 1A:
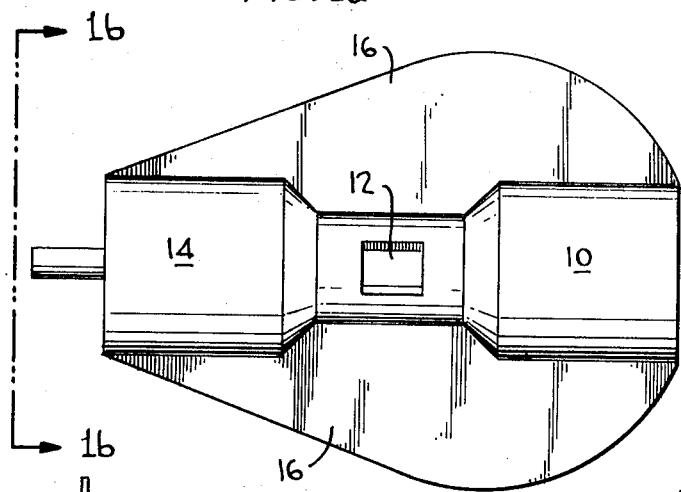
FIG. 1a illustrates a typical pneumatic bubble generator.
Figure 1B:
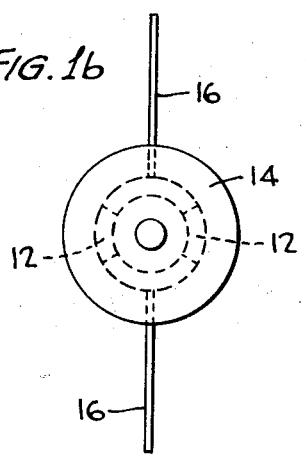
FIGS. 1b and 1c illustrate different numbers and configurations of vanes and ports of a bubble generator.
Figure 1C:
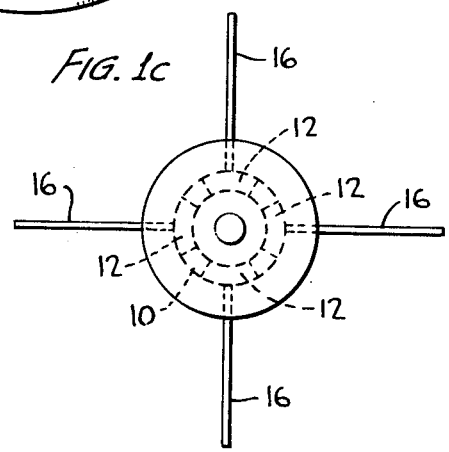
Figure 2B:
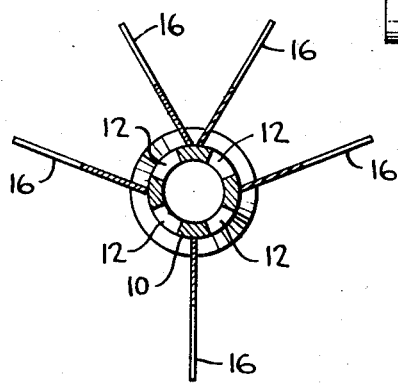
Figure 2A:
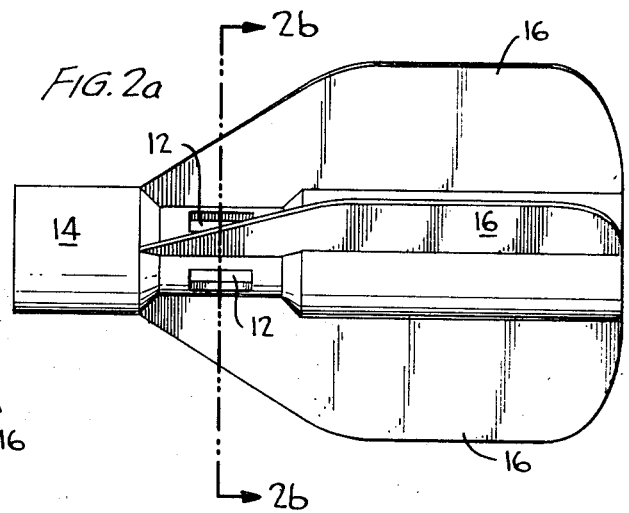
Figure 3A:
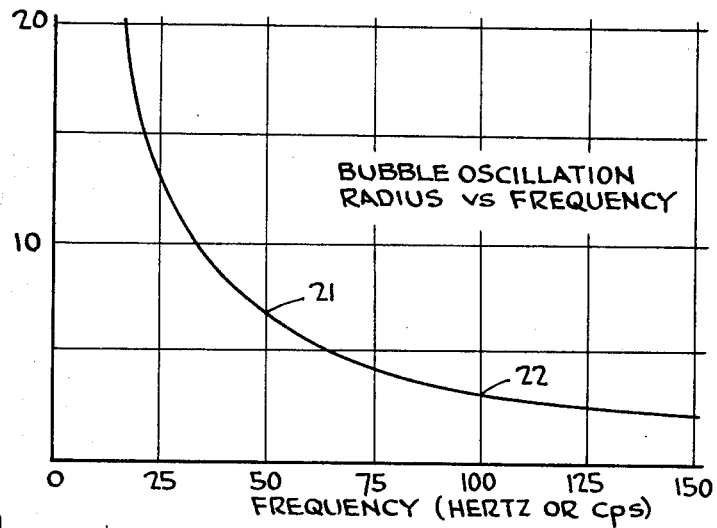
Figure 3B:
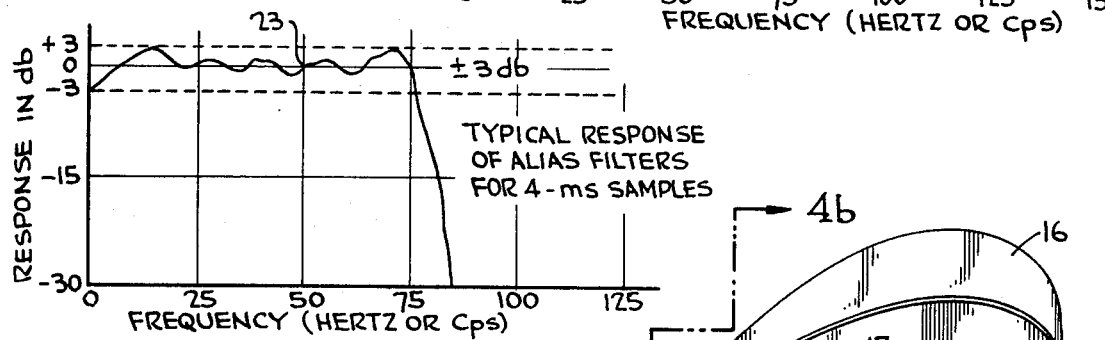
Figure 4A:
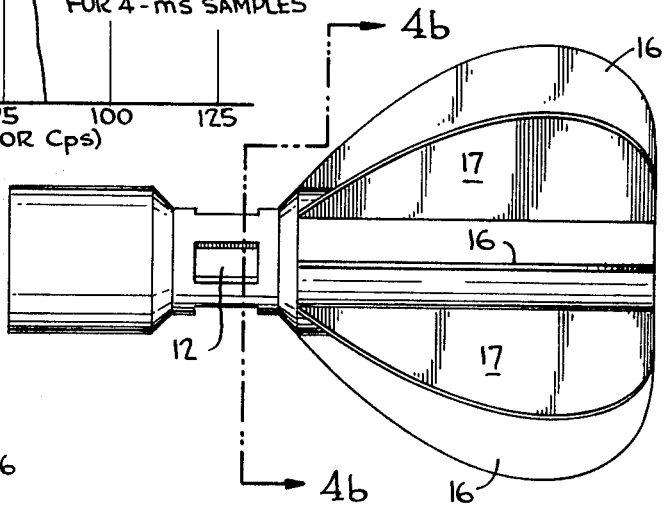
Figure 4B:
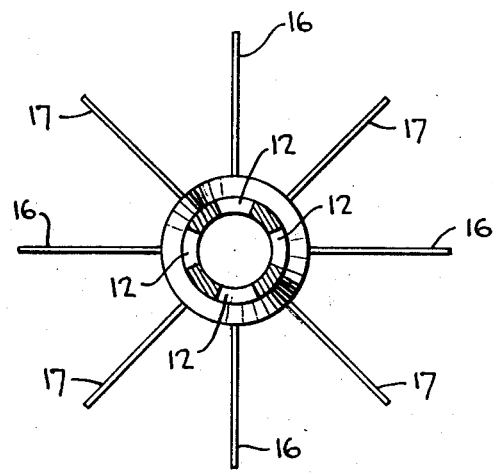

FIGS. 2a and 2b respectively represent a side view and a section of a preferred embodiment of the invention;

FIGS. 3a and 3b illustrate how decreasing the bubble size can shift the bubble frequency above the signal spectrum so that the noise from the bubble oscillation is attenuated by alias filters;

FIGS. 4a and 4b illustrate a variation of the embodiments illustrated in FIGS. 1b and 1c;

FIGS. 5a – 5c illustrate a further embodiment of the invention utilizing variable sized ports; and FIGS. 6a and 6b illustrate an embodiment incorporating the various individual features of the invention.

The invention may be used in conjunction with known marine seismic air guns such as are disclosed in U. S. Pat. Nos. 3,310,128 and 3,249,177 to Chelminski. Such air guns suddenly release the high-pressure air directly into the water with a high-energy yield concentrated in the desired range of seismic frequencies. Typically, an explosively released charge of 600 cubic inches of air at 2,000 pounds per square inch has been found to be an effective replacement for seismic shots of up to 100 pounds of dynamite. Such air guns are typically towed behind a vessel and are charged with high-pressure air by a shipboard compressor and are triggered by electrical pulses under control of the seismic recording system.

With reference to FIG. 1a, air gun 10 includes air port 12. Air is stored at high pressure in firing chamber 14 and is released explosively through four air ports located adjacent to chamber 14, with only one air port 12 being illustrated in FIG. 1a. The operation of such an air gun is sufficiently well-known so that a further detailed description is unnecessary for the purposes of this invention. According to this invention, vanes 16 are provided to separate the air bubbles released from the air ports.

In FIG. 1b, vanes 16 are shown as mounted on the outside of chamber 14 diametrically opposite one another and there are two air ports 12 provided adjacent to chamber 14 for releasing air to the surrounding water. In FIG. 1c, four vanes are shown displaced at 90° intervals around the periphery of air gun 10 with each vane 16 bisecting an associated air port 12 so that the bubble emanating therefrom is divided into two, thereby decreasing its radius and volume. The increase of the number of ports and the segmenting of each of the ports one from the other provides a further reduction in the radius of the air bubble. Thus, in accordance with the invention, the vanes may either be spaced between the ports or mounted to bisect the individual ports.

The length of the vane (in the direction of boat movement) is determined by several factors. If the boat moves 10 feet per second and if the period of the bubble oscillation is 0.01 second, then the boat would move 1/10 of a foot between oscillations. If the fin was one-foot long, the tenth oscillation of the bubble would be isolated and damped by the fin. In general, this is sufficient isolation and damping. If the period of the bubble oscillation is 0.02 seconds, twice the preceding period, the length of the fin should be twice as long for normal conditions.

The frequency response of the recording system determines the desired bubble resonant frequency (the reciprocal of the period). In general, 100 to 120 Hertz or a higher frequency is preferred; but if only lower frequencies are used for the signal (such as a maximum of 40 cps), then a bubble resonant frequency of 60 Hertz could be acceptable.

The vane should extend far enough radially from the air gun so that the bubbles will not join around the fin to form one large composite bubble. In general, the range or length of fin would be from several inches to a foot. Fins radiating from the gun at angles above the horizontal will tend to move the bubbles away from the gun. Lower placed fins on the gun can radiate farther from the gun to move the bubbles farther from the gun than bubbles from the upper fins, as illustrated in FIG. 2b.

FIG. 2a illustrates another embodiment of the invention wherein vanes 16 extend forward of air ports 12 to a position whereby each port is separated from the other ports by the vanes. In FIG. 2b, the angle of incidence made by the vanes 16 with the surface of gun 10 is illustrated. As illustrated in the Figure, the angle of incidence may be varied from a right angle to an acute angle and two vanes may connect with the air gun at the same point. The advantageous feature of this embodiment is that the air bubbles which are released from the various ports 12 will travel out and away from the air gun, thereby attenuating or reducing the possibility of the several individual air bubbles combining after the apparatus has moved forward and preventing repeated low frequency oscillation.

In FIG. 3a, the bubble oscillation frequency is plotted as a function of the radius of the bubble. If the bubble is very large, the resonant frequency is very low. As the size of the bubble decreases, the resonant frequency increases. A resonant frequency of 50 Hertz is indicated at 21. If the same volume of air is placed into eight bubbles instead of one bubble, each of the eight bubbles would have one half of the radius of the original bubble and the resonant frequency would be doubled (100 Hertz), as indicated at 22.

In FIG. 3b, the response curve of a typical alias filter for 4-millisecond samples is illustrated at the same frequency scale as used in FIG. 3a. The electrical signals from each array of seismic detectors is transmitted over one pair of wires in the cable to the recording equipment on the boat. The signals are filtered electrically including alias filtering before the signals are sampled for digital recording. A typical response is flat within the zone of 3 db to 75 Hertz and then the response falls off very rapidly to −75 db (or −90 db in some equipment). The 50 Hertz noise originating from the bubble oscillation would be passed through the alias filters without attenuation since the response is high at 23 (50 Hertz). The response of the alias filter is as low as practical at 100 Hertz so this oscillation would be severely attenuated by a factor such as −75 db, as indicated at 24.

In FIG. 4a, vanes 16 are located aft of air ports 12 and between the air ports. This is a modification of the structure illustrated in FIG. 2a; however, the vanes do not extend forward to a position in front of the ports as in FIG. 2a. Vanes 16 do not extend over the air ports 12 but should be very close to the ports so that the air will be separated into separate bubbles before the first collapse. Less than one inch separation is generally required.

FIG. 4b is a section of the same structure shown in FIG. 4a illustrating the fact that the vanes 16 may be located to bisect air ports 12 and other vanes 17 are located in position midway between respective air ports 12.

FIGS. 5a – 5c illustrate a further modification of the invention whereby the air ports are made of different sizes to attenuate the noise generated by the repeated oscillation of the bubbles.

The pressure in chamber 110 is the same near air ports 112, 113, 114, and 115. More air will egress from the largest air port 115 and successively smaller amounts of air will egress from the successively smaller ports 112, 113, and 114 forming four different sized bubbles separated by fins not shown. The resonant frequencies of these bubbles can be computed from the first formula, supra. The individual bubbles will collapse at different times so that destructive interference will occur rather than reinforcement from identically sized bubbles oscillating at the same frequency. In general, only a small differential in size is sought in order that the bubbles collapse at slightly different times for ten or more oscillations. A material such as the undercoating used on automobiles can be placed on the fins to further attenuate the oscillation series. Most of these materials act as a viscoelastic media and have an attenuation proportional to the square of the frequency. Hence doubling the frequency of the bubble oscillation will make the damping four times as large as the original. Thus, the highly effective damping of the given frequencies can be realized.

FIG. 6a illustrates an embodiment of the invention which incorporates the previous embodiments; the use of vanes 16 which are disposed about the periphery of air gun 10 to separate the air port. As shown in FIG. 6b, the vanes 16 may form different angles of incidence with the surface of the air gun. As shown in FIG. 6b, the air ports are all of the same dimensions; however, in accordance with the foregoing description the sizes of the air bubbles may be varied to alter the size of the bubbles emanating therefrom. Thus, by the use of multiple ports of varying dimensions, and the use of damping media on the plates, a significant decrease in the radius of the air bubble may be achieved and also a high degree of damping may be attained. This results in a higher resonance frequency so that the filters which are normally used in seismic recording equipment will attenuate the high noise frequencies.

In the preceding illustrations, there are only four ports in a gun as is standard in the seismic industry today. The number of the ports could be increased, such as doubled, and the number of fins increased accordingly. If this is done, the space between the lower fins will tend to hold the bubbles close to the fins, rather than move the bubbles away from the fins as shown in FIG. 2b. Covering the fins with coating would reduce the corrosion caused by the bubble collapse on the fin and likewise attenuate bubble oscillation.

This invention also applies to other seismic sources including exploding gases or solids. In the case of explosions, it has been common to have the explosion near the surface so that most of the by-products are expelled to the surface. It has been suggested that the charge should be placed at a depth just sufficient to cause a blow-out (vent to the surface). This is a very inefficient mode of operation since a deeper charge will generate a much larger initial pulse. In practice a much smaller charge may be used at a deeper depth and an assembly consisting of fins around a central rod is pulled through the bubble in order to break it up into numerous smaller bubbles. These small bubbles could be made different in size by using different spacings between the vanes. The small bubbles would collapse at different times and destructive interference would reduce the noise from repeated bubble oscillations.

What I claim is:

1. Apparatus for reducing the size of gas bubbles generated by an underwater seismic source comprising:
   pressure means for suddenly releasing high-pressure gas into the surrounding water;
   separating means fixed in location around said seismic source for separating said gas into a plurality of bubbles;
   said pressure means and said separating means being constructed and arranged so that a plurality of gas bubbles are created simultaneously;
   said separating means extending a greater distance from the source than the radius of the largest of said plurality of bubbles.

2. Apparatus as in claim 1 wherein said means for releasing has apertures and said means for separating gas bubbles comprises vanes separating said apertures.

3. Apparatus as in claim 2 wherein said vanes extend between said apertures and beyond both ends of said apertures.

4. Apparatus as in claim 2 wherein said vanes are mounted over each aperture to divide each aperture.

5. Apparatus as in claim 2 wherein said pressure means for releasing includes an air chamber and said vanes are mounted to form different angles of incidence with said air chamber.

6. Apparatus as in claim 2 wherein said pressure means for releasing includes an air chamber and said vanes are formed in V-shaped pairs and are mounted to said air chamber at their joined ends.

7. Apparatus as in claim 1 wherein said means for releasing includes an air chamber and said air chamber further includes apertures with different sizes for releasing different quantities of air into the individual bubbles.

8. Apparatus as in claim 2 with a damping media on said apparatus.

9. Apparatus as in claim 2 wherein said apertures have different sizes.

10. Apparatus as in claim 9 with a damping media on said apparatus.

11. Apparatus for reducing the size of gas bubbles generated by an underwater seismic source comprising:
    pressure means for suddenly releasing a high-pressure gas bubble into the surrounding water through a plurality of apertures;
    a plurality of stationary vanes separating such apertures to divide the gas bubble into a plurality of gas bubbles.

* * * * *